United States Patent
Yamauchi et al.

(10) Patent No.: US 8,359,607 B2
(45) Date of Patent: Jan. 22, 2013

(54) OPTICAL DISC DRIVE

(75) Inventors: Yoshiaki Yamauchi, Omitama (JP); Hideyuki Nagamine, Urayasu (JP); Seiji Hamaie, Kawasaki (JP); Ikuo Nishida, Ebina (JP); Tatsuya Yamasaki, Hitachinaka (JP)

(73) Assignees: Hitachi Consumer Electronics Co., Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 13/085,514

(22) Filed: Apr. 13, 2011

(65) Prior Publication Data

US 2011/0258650 A1 Oct. 20, 2011

(30) Foreign Application Priority Data

Apr. 16, 2010 (JP) ................................. 2010-094595

(51) Int. Cl.
 *G11B 17/02* (2006.01)
(52) U.S. Cl. ...................................................... 720/650
(58) Field of Classification Search ........................ None
 See application file for complete search history.

(56) References Cited

U.S. PATENT DOCUMENTS

| 7,137,131 B2 * | 11/2006 | Park et al. ..................... 720/650 |
| 8,122,463 B2 * | 2/2012 | Yang et al. ..................... 720/650 |
| 2004/0111732 A1 * | 6/2004 | Park et al. ..................... 720/650 |

FOREIGN PATENT DOCUMENTS

| JP | 2002-245770 | 8/2002 |
| JP | 2005-123001 | 5/2005 |

* cited by examiner

*Primary Examiner* — Mark Blouin
(74) *Attorney, Agent, or Firm* — Antonelli, Terry, Stout & Kraus, LLP.

(57) ABSTRACT

From an optical disc drive, internal static electricity has to be discharged to the outside to prevent breakage of electric components such as laser diodes. A grounding spring has been used to discharge static electricity from a unit mechanism to the enclosure of the optical disc drive but it is necessary to improve the reliability of the drive in consideration of the dimensional accuracy and workability of the spring. Thus the free end of a grounding spring having a cantilever structure is shaped like an arc and an end of the grounding spring has a curved structure. This configuration improves the dimensional accuracy and workability of the spring, so that the performance of the optical disc drive can be more reliable.

5 Claims, 6 Drawing Sheets

DIRECTION A

OPTICAL DISC DRIVE

CLAIM OF PRIORITY

The present application claims priority from Japanese patent application serial no. 2010-94595 filed on Apr. 16, 2010, the content of which is hereby incorporated by reference into this application.

BACKGROUND OF THE INVENTION

1. Field of the Invention

The present invention relates to a grounding spring for processing static electricity generated in an optical disc drive.

2. Description of Related Art

In an optical disc drive, components may be damaged by static electricity generated in the drive. An optical head, which is a main component of a disc drive for reproducing or recording information on a disc surface, includes a laser diode and the laser diode may be damaged by static electricity. Thus recording and reproduction of the optical disc drive may be interrupted by static electricity.

In an anti-static structure according to the related art, static electricity is discharged from the inside to the enclosure of an optical disc drive by a grounding member composed of a conducting member.

For example, JP-A 2002-245770 discloses a structure in which an ESD (Electro-Static Discharge) pattern is formed from a connector to the vicinity of a threaded hole on an insulating layer on the front side of a motor base of a spindle motor and an ESD plate is soldered to the ESD pattern to discharge static electricity to an external circuit via the connector.

Further, for example, JP-A 2005-123001 discloses an anti-static structure in which static electricity is prevented by conductive elastic members. The conductive elastic members are composed of conductors cylindrically wound between at least three conductive members and are elastically deformable along the respective cylindrical axes.

However, in the technique of JP-A 2002-245770, the ESD pattern has to be additionally formed on the motor base of the spindle motor. Further, it is necessary to provide solder connection between the ESD plate and the ESD pattern and wiring for discharge from the connector to the external circuit. Moreover, components cannot be easily replaced in a defective condition and the cost may increase.

In the technique of JP-A 2005-123001, the cylindrical elastic members (close-coiled springs) are provided between the conductive members in an optical disc drive. However, the conductive members are provided in quite a small space (gap) of the optical disc drive and thus it is difficult to mount the cylindrical elastic members under the dimensional restrictions.

SUMMARY OF THE INVENTION

The present invention has been made in view of the above circumstances and relates to prevention of static electricity in an optical disc drive. The present invention provides an anti-static structure that can reliably discharge internal static electricity to the outside, in consideration of the dimensional accuracy and workability of the components of the structure.

An aspect of the present invention is an optical disc drive including: an optical head that performs recording and reproduction on a disc by means of an optical device; a spindle motor that rotationally drives the disc; a support member that supports the spindle motor; and a conductive enclosure that accommodates the optical head, the spindle motor, and the support member, the support member including a grounding spring having an arc-shaped portion, the grounding spring electrically connecting the support member and the enclosure.

It is desirable that the grounding spring be connected to the support member, be shaped like a cantilever so as to be curved into an arc from the support portion to the free end of the grounding spring, and be electrically connected to the enclosure via a conductive unit mechanism lower cover and a main circuit board.

Further, it is desirable that the grounding spring have a curved structure on the end of the arc-shaped portion, the curved structure being inverted from the arc-shaped portion.

Moreover, it is desirable that the grounding spring have a contact member as another member on the end of the arc-shaped portion.

Further, it is desirable that the optical disc drive include an electric wiring member in a space between the arc-shaped portion of the grounding spring and the support member.

Moreover, it is desirable that the conductive enclosure have a ground potential during use.

ADVANTAGES OF THE INVENTION

According to the present invention, static electricity generated in a disc drive can be reliably discharged to the outside and dimensional accuracy and ease of assembly can be improved for a spring serving as a grounding member, achieving a reliable optical disc drive.

BRIEF DESCRIPTION OF THE DRAWINGS

Embodiments of the present invention will be described in detail based on the following figures, wherein.

DETAILED DESCRIPTION OF THE PREFERRED EMBODIMENTS

Figure 1:
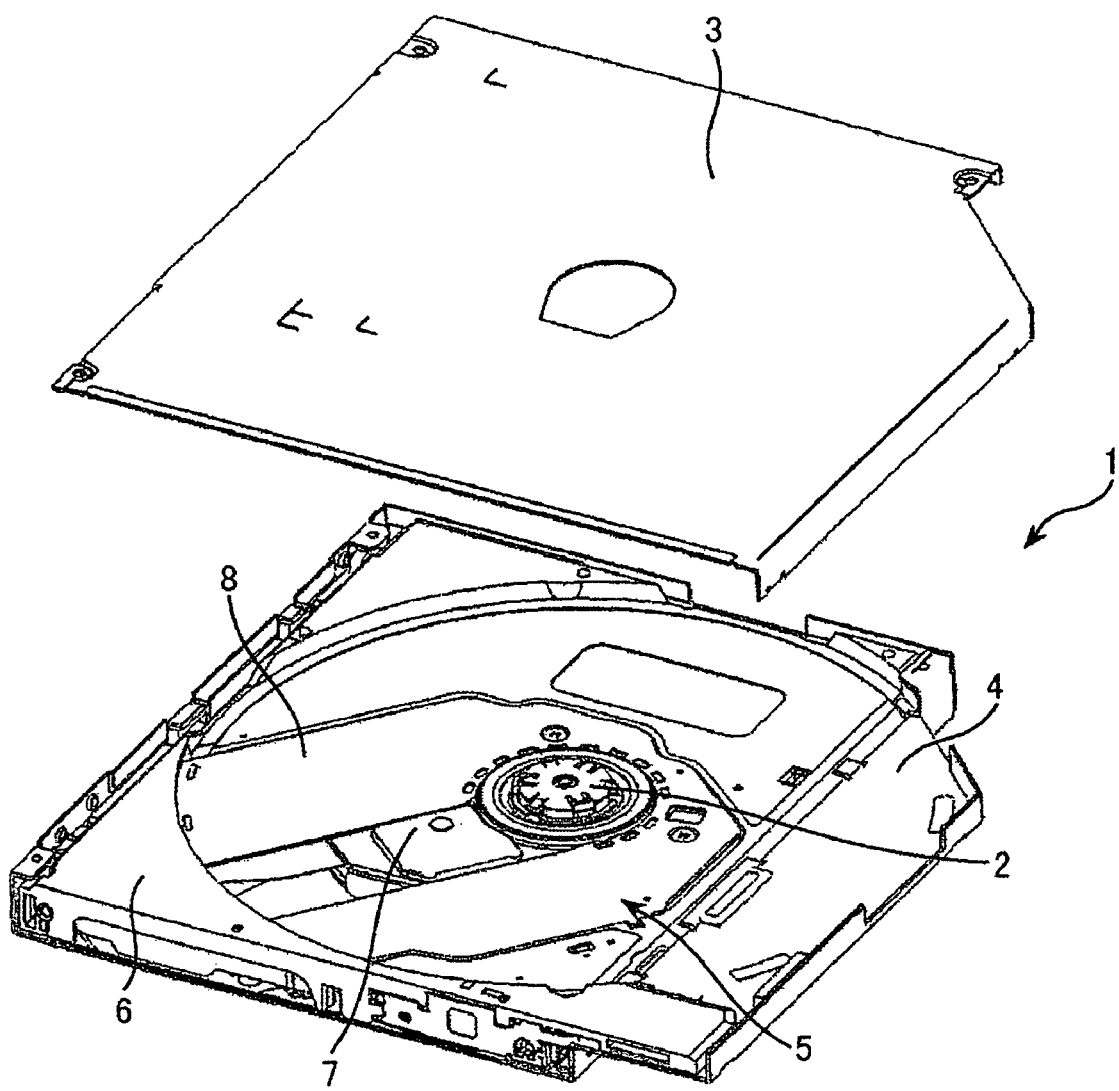
FIG. 1 is an exploded perspective view showing the structure of a typical optical disc drive.

The following will describe embodiments of the present invention.

Embodiment 1

An optical disc drive 1 according to an embodiment of the present invention will be described below with reference to the accompanying drawings. FIGS. 1 to 5 illustrate a first embodiment of the present invention. In FIGS. 1 to 5, the same reference numerals denote the same constituent elements with the same basic configurations and operations.

First, the following will describe the configuration of the optical disc drive 1 according to the embodiment of the present invention.

FIG. 1 is an exploded perspective view showing the optical disc drive 1 according to the present embodiment. The optical disc drive 1 records and reproduces information on the recording surfaces of recording media (hereinafter, will be called discs) that are 120 mm in diameter and 1.2 mm in thickness. The recording media include a CD, a DVD, and a BD (Blu-ray Disc). The optical disc drive 1 according to the embodiment of the present invention is substantially shaped like a thin box having a width of 130 mm, a depth of 130 mm, and a thickness of 12.7 mm (or 9.5 mm). The optical disc drive 1 is called a slim (or super-slim) drive installed in a mobile personal computer. The optical disc drive 1 includes an enclosure assembled from a top cover 3 and a bottom cover 4 by fitting and screwing. The top cover 3 and the bottom cover 4 are fabricated by press-molding steel sheets. The enclosure (the optical disc drive 1) contains a disc tray 6 that is a resin molded product. On the front end of the disc tray 6, a front panel (not shown) is attached from which a disc is loaded and unloaded. On the underside of the disc tray 6, a unit mechanism 5 is attached. The unit mechanism 5 is attached to the disc tray 6 via plural insulators 13 (see FIG. 2), each being composed of an elastic member. The insulator 13 attenuates vibrations and impacts that are transmitted from the outside of the drive to the unit mechanism 5 or vibrations and impacts that are transmitted from the unit mechanism 5 to the outside. The unit mechanism 5 has a unit mechanical chassis 9 (see FIG. 2) which is a base not illustrated in FIG. 1. Attached on the unit mechanical chassis 9 are: a spindle motor 2 for rotationally driving a disc; an optical head 7 for reproducing or recording information on the recording surface of the disc; a driving unit for moving the optical head in the radial direction of the disc; and a unit mechanism upper cover 8 for preventing contact to these components and blocking electrical noise. At the center of the disc tray 6, a circular groove is formed that is slightly larger than the external diameter of the disc. A notch hole is partially formed on the bottom of the circular groove to expose the unit mechanism upper cover 8, the optical head 7, and the spindle motor 2 of the unit mechanism 5. For loading or unloading the disc, the disc tray 6 is slid out of the optical disc drive 1 from the front panel by guide mechanisms provided on both sides of the disc tray 6.

The embodiment of the present invention relates to the structure of a grounding spring 12 that discharges static electricity generated in the optical disc drive 1 to the outside. Since the grounding spring 12 protects the components from static damage, the reliability of the optical disc drive 1 is improved.

Figure 2:
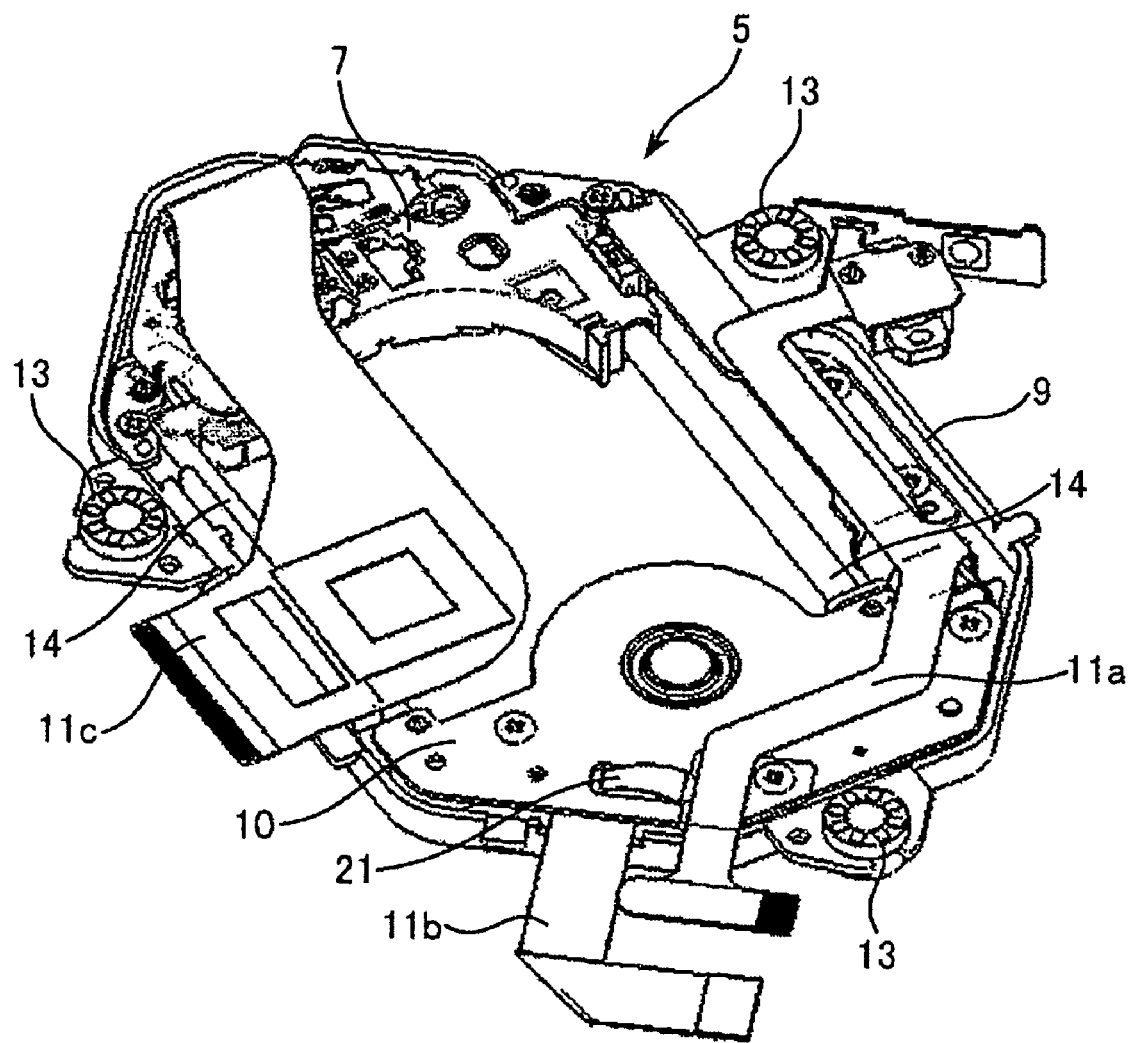
FIG. 2 shows a unit mechanism including a grounding spring according to an embodiment of the present invention.

FIG. 2 is a perspective view showing the backside of the unit mechanism 5 of FIG. 1. The configuration of the unit mechanism 5 will be specifically described below. On the unit mechanical chassis 9 serving as a base having a frame structure of a press-molded steel sheet, the spindle motor 2 is secured by screwing at three points on a spindle motor plate 10. Further, two guide bars 14 are each secured with both ends screwed on the unit mechanical chassis 9. The optical head 7 is slidably supported by the two guide bars 14 via bearings. The unit mechanism 5 is elastically supported on the disc tray 6 by insulators 13 provided at three points outside of the unit mechanical chassis 9. On the backside of the unit mechanism 5, FPCs (Flexible Printed Circuits) 11a, 11b, and 11c are disposed as electric wiring members for connection to various electric components.

The electro-static discharge structure according to the embodiment of the present invention is a grounding spring 21 that is a conductive member screwed on the spindle motor plate 10. The grounding spring 21 discharges the static electricity of the unit mechanism 5 to the outside. Actually, a unit mechanism lower cover 15 of a conductive steel sheet is attached so as to cover the backside of the unit mechanism 5 and the static electricity is discharged to the unit mechanism lower cover 15 through the grounding spring 21.

Figure 3:
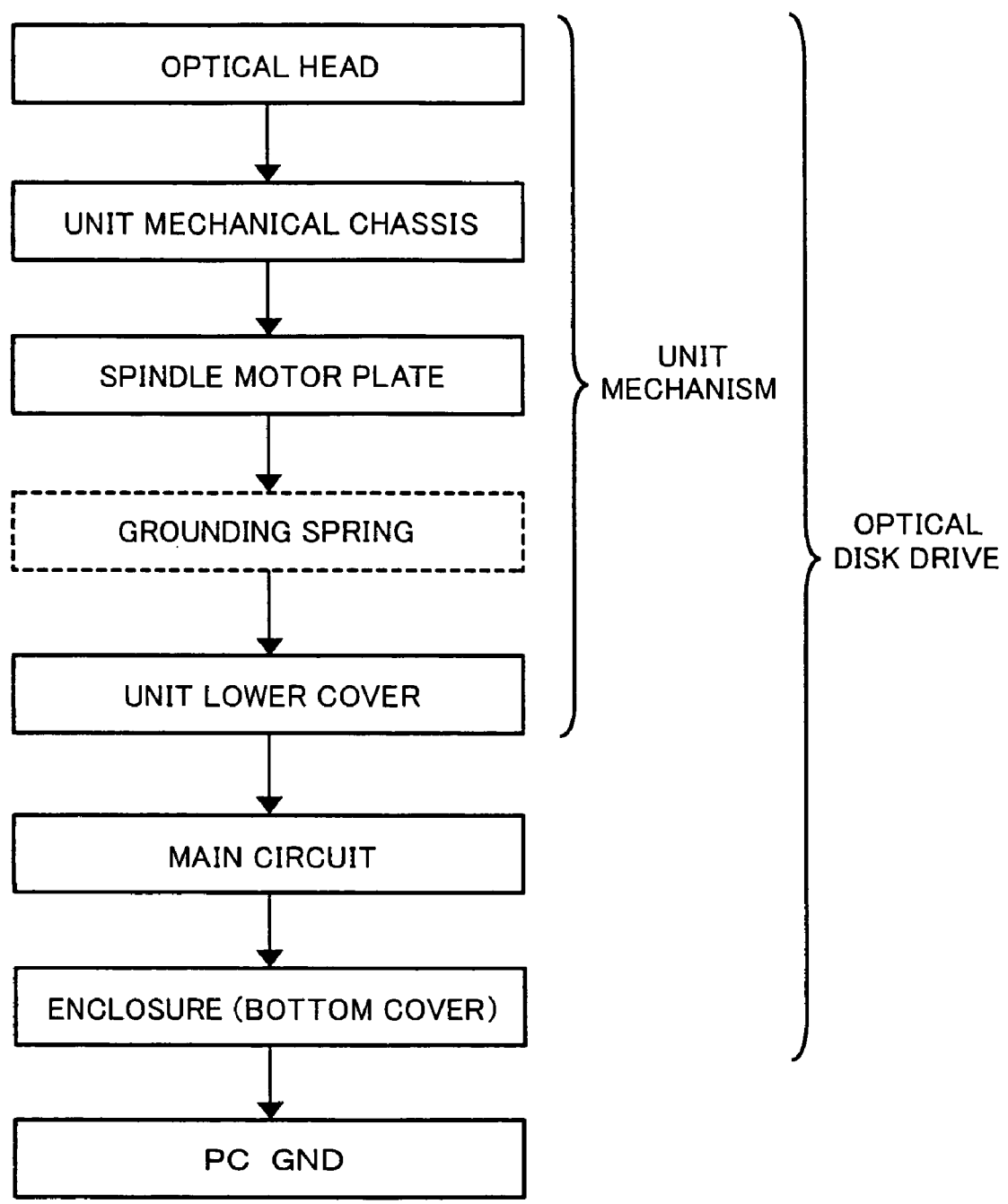
FIG. 3 is an explanatory drawing showing the flow of electro-static discharge of the optical disc drive.

FIG. 3 is a flowchart showing the discharge of static electricity generated in the optical disc drive 1 to the outside. The flow of static electricity is, for example, a discharge path for preventing electro-static destruction on the laser diode or any other devices in the optical head 7. Static electricity flows from the optical head 7 to the spindle motor plate 10 through the guide bars 14 via the bearings, the unit mechanical chassis 9, and the conductive components. Further, the grounding spring 21 according to the embodiment of the present invention passes the static electricity to the unit mechanical lower cover 15 installed on the backside of the unit mechanism 5, and then the static electricity flows to a main circuit electrically connected to the unit mechanism lower cover 15 and flows from the main circuit to the bottom cover 4 or the top cover 3, which is the enclosure of the optical disc drive 1, through wiring members including FPCs 11. Static electricity is discharged from the optical disc drive 1 to the outside by electrically connecting the bottom cover 4 or the top cover 3, which is the enclosure of the drive, to the ground of a PC. In other words, the conductive enclosure is set at a ground potential at least when the optical disc drive is used, thereby preventing failures caused by electro-static discharge during assembly. Moreover, the optical disc drive is assembled at the ground potential, thereby preventing failures caused by electro-static discharge during the assembly.

Figure 4:
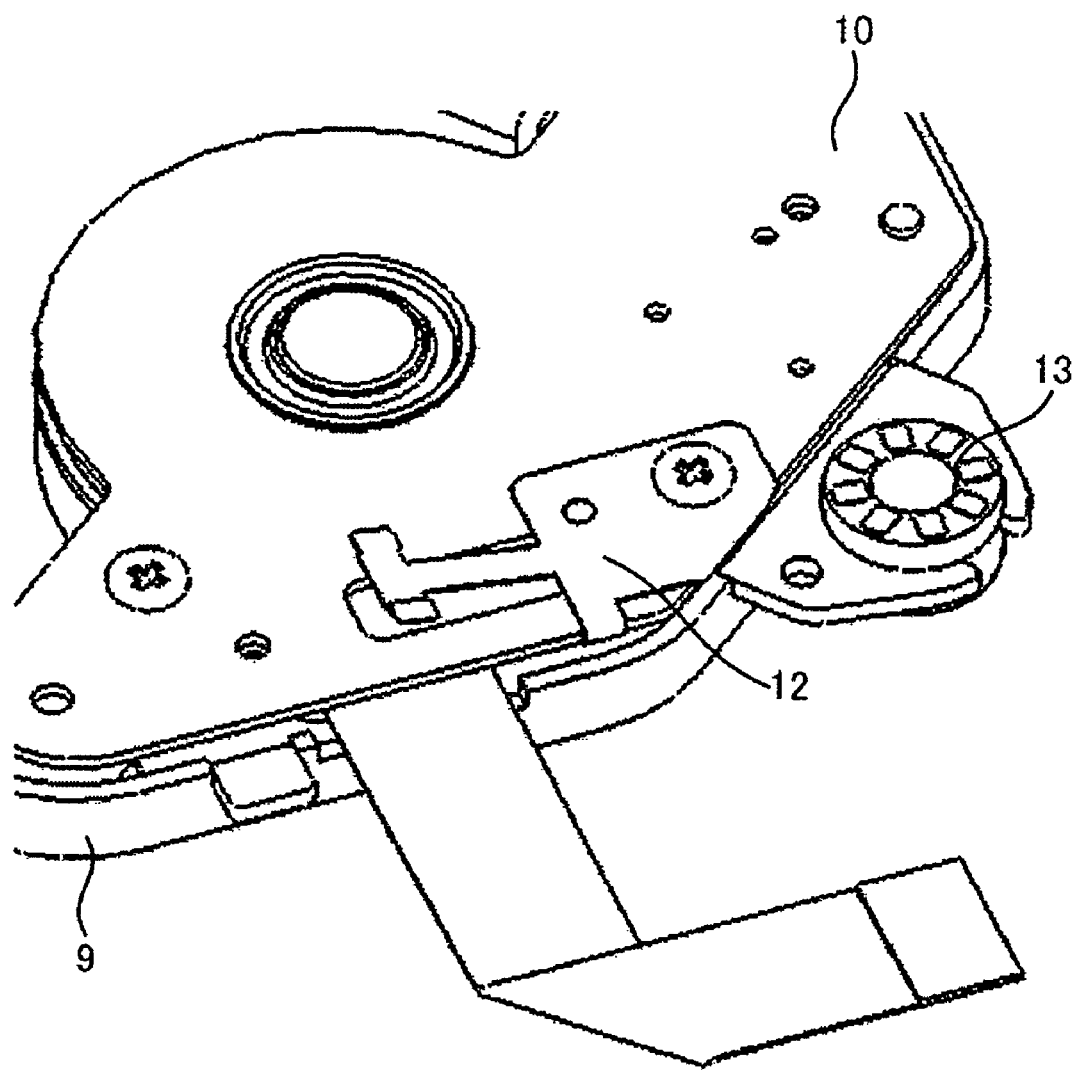
FIG. 4 shows the structure of a grounding spring mounted on a spindle motor plate according to a comparative example.

FIG. 4 shows a spindle motor plate 10 of an optical disc drive 1 according to a comparative example. The spindle motor plate 10 has a grounding spring 12 for electro-static discharge. The grounding spring 12 is a spring of a steel sheet and is formed by bending. The grounding spring 12 is secured with a screw on the spindle motor plate 10 and has a cantilever plate structure with a screw portion serving as a fixed portion. Further, the grounding spring 12 has a T-structure on the end of a free portion and is bent so as to have bent portions on the fixed portion and the free portion. The spindle motor plate 10 and the grounding spring 12 are electrically connected to each other at the screw portion, and the grounding spring 12 is pressed by the unit mechanism lower cover 15 (not shown), so that the grounding spring 12 is elastically contacted with the unit mechanism lower cover 15 by the bent portions. However, an actual clearance between the unit mechanism 5 and the unit mechanism lower cover 15 is quite small, specifically about 0.1 mm to 0.2 mm and it is quite difficult to obtain bending accuracy for stably contacting the grounding spring 12, which has a partially bent cantilever structure, without generating an external force deforming the unit mechanism lower cover 15. Another disadvantage is that the T-shaped end may damage (may catch and deform an end portion) components during the assembly of the optical disc drive 1.

Figure 5A:
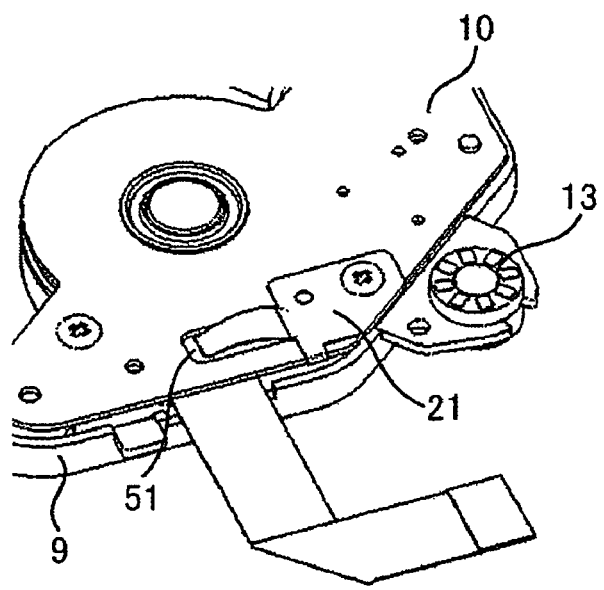
FIGS. 5A to 5C are explanatory drawings showing the structure and effect of the grounding spring according to the embodiment of the present invention.
Figure 5B:
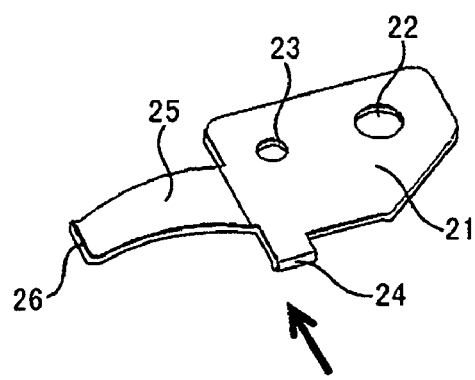
Figure 5C:
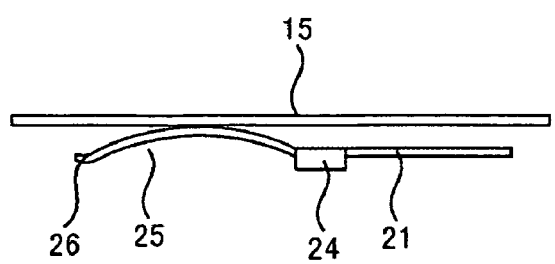

FIGS. 5A to 5C show the grounding spring 21 having an arc-shaped portion according to the embodiment of the present invention. FIG. 5A shows that the grounding spring 21 is provided on the spindle motor plate 10. FIG. 5B is a perspective view of the grounding spring 21. FIG. 5C is a side view from direction A of FIG. 5B. The grounding spring 21 is directly secured by screwing on the spindle motor plate 10 that is a conductive member. For positioning on the spindle motor plate 10, a positioning convex portion is formed beforehand on the spindle motor plate 10. The convex portion is fit into a positioning pin hole 23 of the grounding spring 21 and a claw (hanging portion 24) on the grounding spring 21 is engaged with the end of the spindle motor plate 10 to position the grounding spring 21. The grounding spring 21 includes a mating portion with the spindle motor plate 10 as a fixed portion. Further, the grounding spring 21 includes a cantilever free end having an arc-shaped structure 25. The unit mechanism lower cover 15 (only partially illustrated in FIG. 5C) composed of a conductive thin plate covers the unit mechanism 5 containing the spindle motor plate 10, so that a part of the arc-shaped portion 25 of the grounding spring 21 elastically comes into contact with the unit mechanism lower cover 15. The spindle motor plate 10 has a hole 51 (see FIG. 5A) at a grounding spring end 26. Thus the elastic deformation range is large enough to apply an elastic force even if a clearance is small between the spindle motor plate 10 and the unit mechanism lower cover 15. Further, the free end 26 of the grounding spring 21 has a curved structure inverted from the arc-shaped portion 25, so that sliding and a friction force are improved on the contact portion of the end 26 and scratches are prevented on the contact portion. Instead of the curved structure on the end 26, a soft member or a member having a small friction coefficient, e.g., a resin member may be provided on the end 26.

The arc-shaped structure (arc-shaped portion 25) in FIGS. 5A to 5C achieves higher bending accuracy and improves the stiffness of the bent portions as compared with the partially curved structure of FIG. 4, thereby reducing damage on the components during assembly. Since the grounding spring 21 can be stably contacted to discharge static electricity, the embodiment of the present invention can prevent internal static electricity from causing damage on the components and damage on the components in the assembling process (deformation on the end of the grounding spring when the end is hooked or damage on other components due to the end shape). It is therefore possible to provide the optical disc drive 1 with higher reliability.

Embodiment 2

Figure 6:
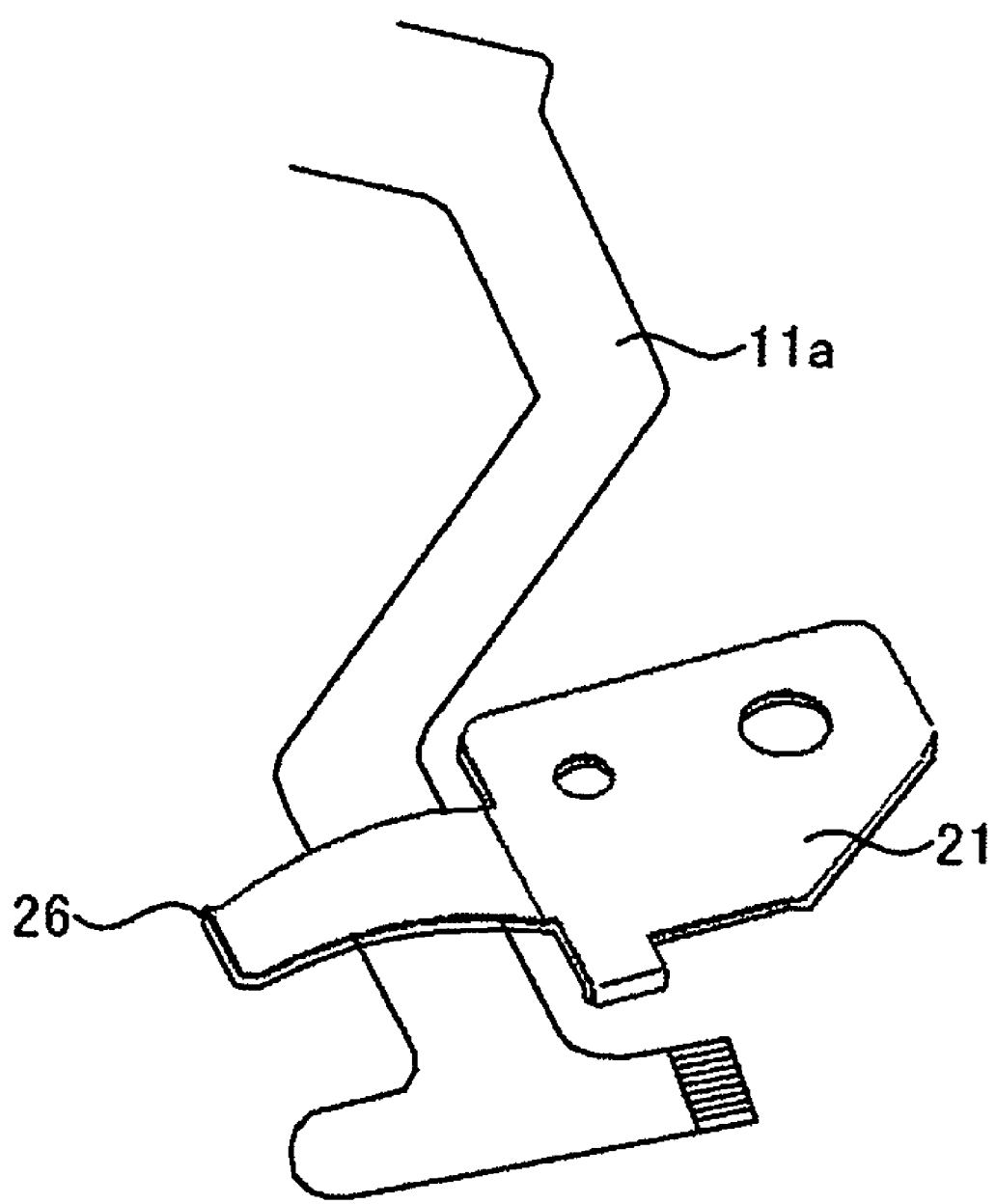
FIG. 6 is an explanatory drawing showing another effect of a grounding spring according to a second embodiment of the present invention.

Referring to FIG. 6, Embodiment 2 of the present invention will be described below.

FIG. 6 shows the grounding spring 21 assembled into the unit mechanism 5 according to embodiment 1 and the FPC 11a of FIG. 2. The FPC 11a passes through a space between the grounding spring 21 and the spindle motor plate 10 (a space formed by the arc-shaped portion 25). This configuration can prevent the FPC 11a from being displaced or hooked. Thus the embodiment of the present invention can prevent internal static electricity from damaging on components, providing an optical disc drive 1 with more reliable electric wiring. Further, the FPC can be disposed in the space formed by the arc-shaped portion 25, thereby saving space.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc drive comprising:
an optical head that performs recording and reproduction on a disc by means of an optical device;
a spindle motor that rotationally drives the disc;
a support member that supports the spindle motor; and
a conductive enclosure that accommodates the optical head, the spindle motor, and the support member;
wherein the support member includes a grounding spring having an arc-shaped portion, the grounding spring electrically connecting the support member and the enclosure; and
wherein the grounding spring is connected to the support member, is shaped like a cantilever so as to be curved into an arc from a support portion to a free end of the grounding spring, and is electrically connected to the enclosure via a conductive unit mechanism lower cover and a main circuit board.

2. An optical disc drive comprising:
an optical head that performs recording and reproduction on a disc by means of an optical device;
a spindle motor that rotationally drives the disc;
a support member that supports the spindle motor; and
a conductive enclosure that accommodates the optical head, the spindle motor, and the support member;
wherein the support member includes a grounding spring having an arc-shaped portion, the grounding spring electrically connecting the support member and the enclosure; and
wherein the grounding spring has a curved structure on an end of the arc-shaped portion, the curved structure being inverted from the arc-shaped portion.

3. An optical disc drive comprising:
an optical head that performs recording and reproduction on a disc by means of an optical device;
a spindle motor that rotationally drives the disc;
a support member that supports the spindle motor; and
a conductive enclosure that accommodates the optical head, the spindle motor, and the support member;
wherein the support member includes a grounding spring having an arc-shaped portion, the grounding spring electrically connecting the support member and the enclosure; and
wherein the grounding spring has a contact member as another member on an end of the arc-shaped portion.

4. An optical disc drive comprising:
an optical head that performs recording and reproduction on a disc by means of an optical device;
a spindle motor that rotationally drives the disc;
a support member that supports the spindle motor;
a conductive enclosure that accommodates the optical head, the spindle motor, and the support member;
wherein the support member includes a grounding spring having an arc-shaped portion, the grounding spring electrically connecting the support member and the enclosure; and
an electric wiring member in a space between the arc-shaped portion of the grounding spring and the support member.

5. An optical disc drive comprising:
an optical head that performs recording and reproduction on a disc by means of an optical device;
a spindle motor that rotationally drives the disc;
a support member that supports the spindle motor; and
a conductive enclosure that accommodates the optical head, the spindle motor, and the support member;
wherein the support member includes a grounding spring having an arc-shaped portion, the grounding spring electrically connecting the support member and the enclosure; and
wherein the conductive enclosure has a ground potential during use.

* * * * *